(12) United States Patent
Baxter et al.

(10) Patent No.: US 8,639,471 B2
(45) Date of Patent: Jan. 28, 2014

(54) WIRELESS POSITION SENSING IN THREE DIMENSIONS USING ULTRASOUND

(75) Inventors: Richard Baxter, Aylesbury (GB); Steven Lavache, Ware (GB)

(73) Assignee: Performance Designed Products LLC, Sherman Oaks, CA (US)

(*) Notice: Subject to any disclaimer, the term of this patent is extended or adjusted under 35 U.S.C. 154(b) by 994 days.

(21) Appl. No.: 12/358,006

(22) Filed: Jan. 22, 2009

(65) Prior Publication Data

US 2009/0187374 A1    Jul. 23, 2009

(30) Foreign Application Priority Data

Jan. 22, 2008 (GB) .................................. 0801126.4

(51) Int. Cl.
```
G01C 9/00      (2006.01)
G01B 5/02      (2006.01)
G01B 7/02      (2006.01)
G01B 11/02     (2006.01)
G01B 13/02     (2006.01)
```
(52) U.S. Cl.
USPC .......................................... 702/152; 702/158

(58) Field of Classification Search
USPC ................................................. 702/152, 158
See application file for complete search history.

(56) References Cited

U.S. PATENT DOCUMENTS

| | | | |
|---|---|---|---|
| 5,831,937 A | 11/1998 | Weir et al. | |
| 6,146,278 A | 11/2000 | Kobayashi | |
| 7,012,521 B2 | 3/2006 | Fardin et al. | |
| 2005/0207671 A1* | 9/2005 | Saito | 382/275 |
| 2006/0202125 A1* | 9/2006 | Suhami | 250/368 |
| 2006/0277571 A1 | 12/2006 | Marks et al. | |
| 2007/0117625 A1 | 5/2007 | Marks et al. | |
| 2008/0009348 A1 | 1/2008 | Zalewski et al. | |
| 2008/0189046 A1* | 8/2008 | Eliasson et al. | 702/19 |
| 2011/0026363 A1* | 2/2011 | Lavache | 367/127 |

FOREIGN PATENT DOCUMENTS

| | | | |
|---|---|---|---|
| EP | 312 481 | * | 4/1989 |
| GB | GB2170907 | | 8/1986 |
| GB | 2337170 | | 10/1999 |
| JP | 09037357 | | 7/1997 |
| WO | WO0016252 | | 3/2000 |
| WO | WO 2007/110626 | * | 10/2007 |
| WO | WO 2009/022089 | * | 2/2009 |

OTHER PUBLICATIONS

English Abstract of EP 312 481, Apr. 1989.*

* cited by examiner

*Primary Examiner* — Michael Nghiem
(74) *Attorney, Agent, or Firm* — Sheppard Mullin Richter & Hampton

(57) ABSTRACT

According to various embodiments, the invention provides a method for establishing communication between a computer program in a computing system and a controller held in a hand of a user, comprising: capturing image data in a capture area in front of a display, the capturing configured to identify a two-dimensional location of the controller in the capture area; and capturing one-way sound communication between a location proximate to the display and a location at the controller, the sound communication being used to compute a third-dimensional location of the controller in the capture area.

13 Claims, 5 Drawing Sheets

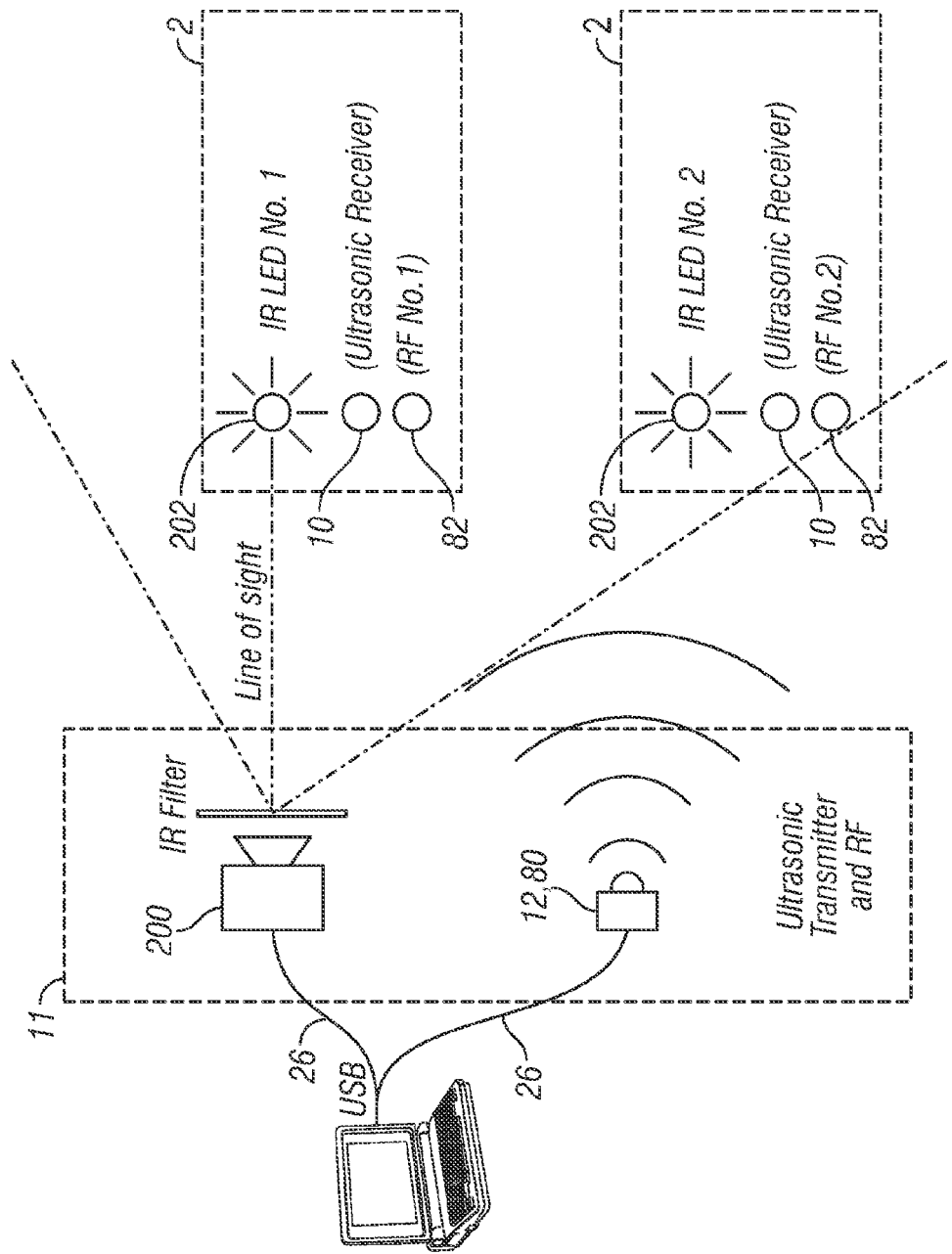

WIRELESS POSITION SENSING IN THREE DIMENSIONS USING ULTRASOUND

CROSS-REFERENCE TO RELATED APPLICATIONS

This application claims priority from United Kingdom Patent Application No. UK0801126.4 filed Jan. 22, 2008, which is hereby incorporated herein by reference.

FIELD OF THE INVENTION

The present invention relates to the sensing of position in three dimensions using ultrasound and infrared and in particular to the sensing of a mobile component relative to a fixed component; the mobile component being free from connection to the fixed component by wires or cables or the like.

DESCRIPTION OF THE RELATED ART

Many attempts have been made to sense position using ultrasound. Typically an ultrasonic emission is made from one component and is received at three or more other components. The three or more other components have a fixed spatial relationship to one another and by measuring the time of flight of the transmission to the three or more receivers, a measure of distance may be made. By using three or more receivers, the differences in time of arrival and the consequent different distance measurements allow trigonometric calculations to be carried out to determine the three dimensional relationship between the mobile and fixed components. Thus far, the theory of ultrasound position sensing is well understood and stands up to close scrutiny.

However, the practicalities of achieving this theoretical goal present several significant obstacles. Firstly, the time of commencement of transmission must accurately be known in order to measure the time of flight of the signal. In a wireless embodiment, this must be achieved without interfering with the signal itself. Secondly, this type of apparatus is frequently used inside buildings. Thus the transmitted signals undergo reflections from internal walls and furniture surfaces and the receivers therefore must distinguish between original and reflected signals in order to accurately determine the time of flight. Thirdly, the absolute time of flight varies according to the characteristics of the air and in particular according to its temperature and pressure. Fourthly, it is desirable that the ultrasound emissions do not cause annoying emissions in the audible frequency range. Of course, these problems must also be solved within the usual constraints of cost and reliable operation.

The invention described below being intended for the computer and console games market is particularly sensitive to the latter constraints of cost and reliability. Thus the invention described below provides a particularly simple, robust and yet highly effective method and apparatus for determining position in three dimensions using ultrasound and without using a wired connection between a fixed component and a mobile component.

U.S. Pat. No. 5,142,506 contains a detailed description of the problems outlined briefly above. The apparatus described therein includes a wired mobile component and seeks to overcome the problem of detecting arrival of the transmitted signal using a complex combination of the resonance characteristics of the transducers and complex circuitry in order to find a zero crossing following the second received cycle above a predetermined amplitude.

U.S. Pat. No. 5,175,695 discloses position detecting apparatus in which arrival of the transmitted signal is carried out using a complex envelope detection and threshold circuit. Activation of a known mobile unit is carried out by transmitting a burst of ultrasound. Calibration is carried out using an air temperature sensor. This device represents a complex and expensive approach to the problems set out above.

EP 0312481 approaches the problem of activating a mobile component by the use of infrared transmissions. This, of course, adds complexity relative to the ultrasonic embodiment of U.S. Pat. No. 5,175,695 and also requires a line of sight provision between the fixed and mobile components.

Hitherto, none of the prior art solutions to the problem of wireless three dimensional position sensing using ultrasound have produced a comprehensive and yet simple solution to the many difficulties which must be overcome in this field of technology.

BRIEF SUMMARY OF EMBODIMENTS OF THE INVENTION

In a first aspect, the invention provides a method for establishing communication between a computer program in a computing system and a controller held in a hand of a user, comprising: capturing image data in a capture area in front of a display, the capturing configured to identify a two-dimensional location of the controller in the capture area; and capturing one-way sound communication between a location proximate to the display and a location at the controller, the sound communication being used to compute a third-dimensional location of the controller in the capture area.

This method results in a simple and effective method for determining the location of the controller that is less sensitive to errors in the sound communication system whilst remaining accurate. Furthermore, the method can be carried out using hardware having only one sound capture device connected to the computer system, reducing cost.

In a second aspect, the invention provides a system for establishing communication between a computer program and a controller, comprising: an image capture device for capturing image data in a capture area in front of a display; a sound capture device for capturing sound data in the capture area; and a computing system for executing the computer program, the computing system being connected to the display, the image capture device, and the sound capture device; the controller to be held by a user with a single hand, the controller including, a body with a first end and a second end; a grip area at about the first end; an input pad defined between the first end and the second end for entering input data to be transmitted to the computing system; a spherical-type section defined at the second end for facilitating image recognition by the image capture device; and a sound emitting device near the second end, the sound emitting device directed away from the user when held and configured for one-way sound communication with the sound capture device; wherein the computer program identifies a two-dimensional location of the controller based on the captured image data and a third-dimensional location of the controller based on the captured sound data.

This system can be used to efficiently and robustly track the location of the controller in three dimensions as it is moved around in view of the image capture device. The controller in particular is a simple device that does not need a great deal of processing power, prolonging its battery life in a cordless environment and reducing the cost for a product that a user will typically buy in greater numbers.

In a third aspect, the invention provides a system for establishing communication between a computer program and a controller, comprising: a first set and a second set of light emitters facing a capture area in front of a display, the first and second set of light emitters located near the display; a sound capture device for capturing sound data in the capture area; and a computing system for executing the computer program, the computing system being connected to the display, and the sound capture device; the controller to be held by a user with a single hand, the controller including, a body with a first end and a second end; a grip area at about the first end; an input pad defined between the first end and the second end for entering input data to be transmitted to the computing system; an image capture device near the second end for capturing image data of an area where the first and second set of light emitters are located; and a sound emitting device near the second end, the sound emitting device directed away from the user when held and configured for one-way sound communication with the sound capture device; wherein the computer program identifies a two-dimensional location of the controller based on the captured image data and a third-dimensional location of the controller based on the captured sound data.

In such a system, the extra cost of including an image capture device in the controller is balanced by eliminating the need for the computer program to determine which light emitter is associated with which controller in a multi-controller situation.

In a fourth aspect, the invention provides a computer program embedded in a computer-readable storage medium, when executed by one or more processors, for establishing communication between a computer program in a computing system and a controller held in a hand of a user, the computer program comprising: program instructions for capturing image data in a capture area in front of a display, the capturing configured to identify a two-dimensional location of the controller in the capture area; and program instructions for capturing one-way sound communication between a location proximate to the display and a location at the controller, the sound communication being used to compute a third-dimensional location of the controller in the capture area.

The computer program found in this storage medium identifies the location of a controller using a simple system that is less prone to error than is found in the prior art.

In a fifth aspect, the invention provides a method for determining the position of a mobile controller, the position to be determined relative to a fixed unit, wherein the mobile controller comprises an IR light source and an ultrasonic transducer, wherein the fixed unit comprises a camera and an ultrasonic transducer, the method comprising the steps of: determining the angular location of the IR light source relative to the fixed unit using the camera; determining the distance between the mobile controller and the fixed unit by measuring the time of flight of ultrasound between them; and determining the 3D position of the controller, relative to the fixed unit, by combining its angular location with its distance.

In a sixth aspect, the invention provides a controller for use with a position sensing apparatus, the controller comprising an IR light source, an ultrasonic transducer and an RF transmitter, the controller being adapted so that in use the IR light source is illuminated and the RF transmitter is used to send information about ultrasonic signals detected by the ultrasonic transducer.

In a seventh aspect, the invention provides position sensing apparatus comprising an ultrasonic transmitter, an ultrasonic receiver, an infrared transmitter, a 2-dimensional infrared receiver such as a camera, a timer and trigger means for activating the timer, the apparatus being divided into a mobile and a fixed component separate from one-another and the ultrasonic and infrared components being located adjacent one-another in heterogeneous pairs on each respective component, the apparatus further including image processing means for processing the image received by the infrared receiver and control means for coordinating the functions of the said receivers, transmitters and timer, the apparatus being arranged in use to transmit an ultrasonic pulse between the ultrasonic transmitter and receiver and substantially simultaneously to start the timer, the timer being stopped when the ultrasonic pulse has been received thereby measuring the time of flight of the ultrasonic energy between the ultrasonic transmitter and receiver and the apparatus further being arranged to determine a 2-dimensional relative angular position of the infrared transmitter and receiver by processing the image received by the infrared receiver, whereby the ultrasonic distance measurement and infra-red angular measurements together provides a 3-dimensional position fix.

BRIEF DESCRIPTION OF THE DRAWINGS

Embodiments of the invention will now be described by way of example with reference to the figures in which:

FIG. 1 is a schematic block diagram of a complete system in accordance with the invention;

DETAILED DESCRIPTION OF THE EMBODIMENTS OF THE INVENTION

Figure 2A:
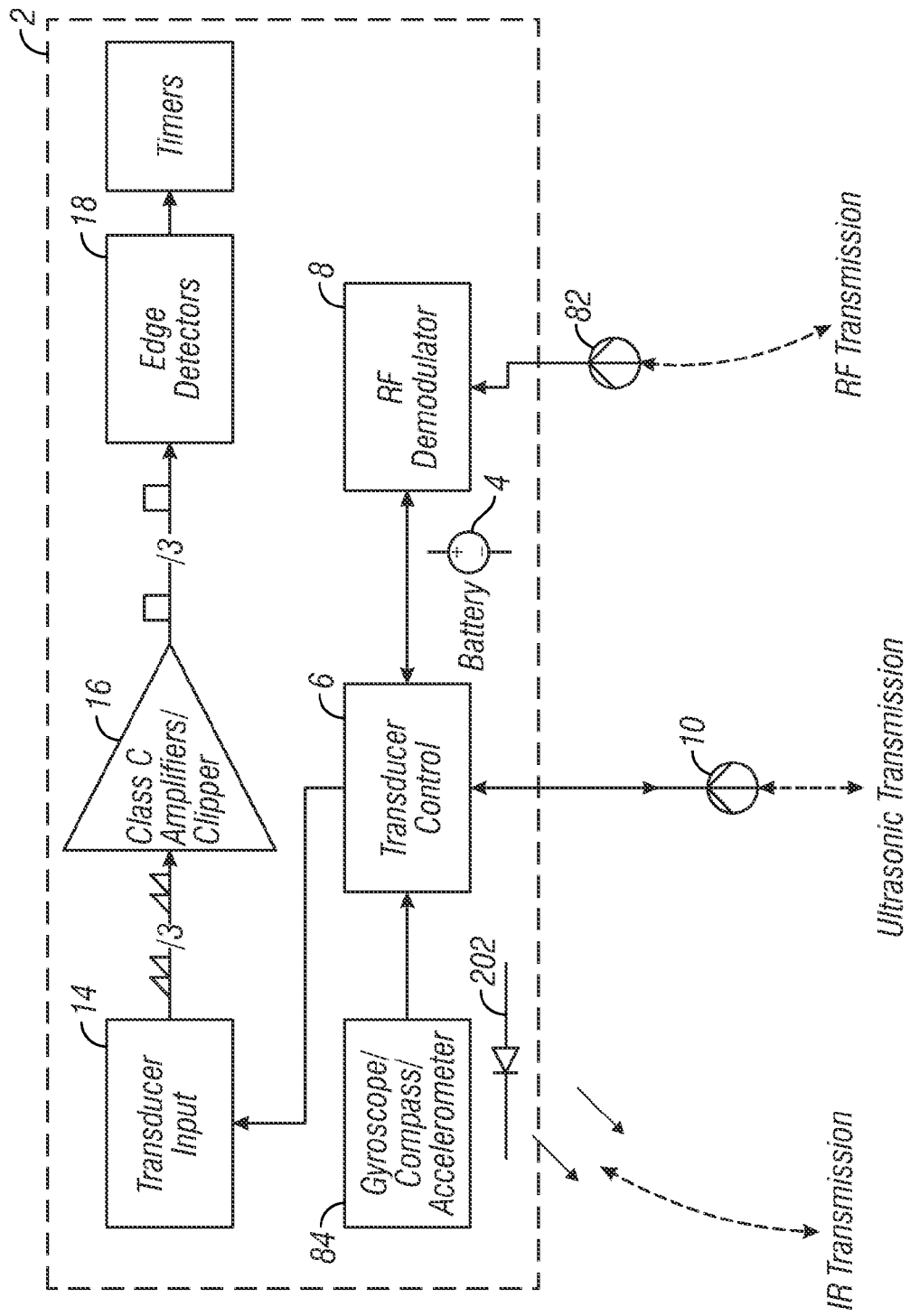
FIG. 2A is a schematic block dia a of a fixed component in accordance with the invention.

With reference to FIG. 1, a mobile component 2 is located within visible range of a fixed component 11. These two components are described in more detail below in connection with FIGS. 2A, 3A. 2B, and 3B. The components communicate with one another so that the position of the mobile component 2 may be determined in three dimensions, relative to the position of the fixed component II . The fixed component is coupled to a computer such as a PC or games console via USB interface 26. Alternative interfaces, such as IEEE 1394 or wireless interfaces such as Bluetooth or IEEE 802.11 may be used. file PC or games console will be connected to or otherwise comprise a display unit of some type for viewing by the user.

The components communicate using ultrasonic, RF and infrared transmission. The mobile component (two mobile components as shown in FIG. 1) each have an infrared LED 202, an ultrasonic receiver 10 and an RF transceiver 82. The three dimensional position of the mobile component 2 is assessed using ultrasonic time of flight measurements as described in our co-pending application PCT/GB2007/003126 and in conjunction with optical position measurement.

Briefly, the ultrasonic transducer 12 transmits an ultrasonic pulse and at the same time the RF transducer 80 indicates that the pulse has been sent. This is received at the ultrasonic receiver 10 of the mobile components and is also received at the RF receivers 82. On receipt of the RF signal respective timers are started in the mobile unit 2. Shortly afterwards, the ultrasonic signal is received and the time difference is transmitted back as data to the fixed component 11. The time difference is representative of the distance between the ultrasonic transducers 10 and 12 as explained in our co-pending application PCT/GB2007/003126.

This information may be pre-processed or may be transmitted in raw form to the PC via USB interface 26. In our co-pending application, several fixed ultrasonic transducers are used and this may be replicated in the present application. However as explained below, it is not necessary to use multiple ultrasonic transducers on the fixed unit to obtain a three dimensional position determination.

The ultrasonic measurement is supplemented by a visual measurement produced by the combination of a camera 200 and respective infrared LEDs 202. The camera preferably is mounted on the fixed unit and the LED is preferably mounted at each position to be sensed on the mobile unit. By processing the image seen by the camera 200, it is possible to determine the angular position of the LEDs 202 relative to the camera 200. This, in combination with a distance measurement provided by the ultrasonic time of flight data, allows a three dimensional position fix to be made on the mobile unit.

Therefore, the camera captures image data from a capture area in front of the fixed component that is preferably located adjacent to the display unit. This image data is used to identify a two dimensional location of the mobile component. Furthermore, the ultrasonic transducers are adapted to capture one-way sound communication between the fixed component and mobile component; this sound communication is used to identify the third dimension component of the location of the mobile component in the capture area. The mobile component may be used as a controller for e.g. video games.

The controller may be adapted to be held in one hand by a user, and have a grip area to facilitate this. The controller may have extra inputs for use by the user such as buttons and joysticks.

One problem with ultrasonic measurement is that, in order to determine accurate measurements, there must be a delay between two sequential measurements to allow the echo from the first signal to "die down" before a further signal is sent. A typical value of time allowed for this is 33 ms. If each mobile component transmits an ultrasonic signal for the uses of range detection, this can lead to a long delay between range measurements for a mobile component when a plurality of mobile components are interfacing with the same fixed component. One solution to this problem is to have the fixed component function as the ultrasonic transmitter, and detect the signal it produces at the mobile components. This allows the range of the mobile components to be polled more frequently than would otherwise be possible.

This greatly simplifies the use of ultrasonics for position fixing. In particular, it is not necessary to differentiate between particular mobile devices since a single ultrasonic pulse can be measured at each of the mobile units and their angular separation be determined using the infrared hybrid addition.

It will be appreciated that the location of the components on either the mobile or fixed component may be reversed as desired. In particular, the camera 200 may be mounted in the mobile component and infrared LEDs mounted on the fixed unit. Furthermore, the ultrasonic signals could be sent from the mobile component and received at the fixed component, with the disadvantages mentioned above. In such an embodiment, the fixed component would preferably have at least a first and a second infrared emitter, located on different parts of the component. This allows the location of the mobile component in 3D space to be calculated, rather than its orientation with reference to the fixed component.

With reference to FIG. 2A, a mobile component 2 has a battery power supply 4, a transducer controller 6 and a demodulator 8.

An ultrasonic transducer 10 is coupled to the transducer controller 6 and an RF transducer 82 is coupled to the demodulator 8.

The transducer 10 is arranged to have a wide dispersal angle typically greater than 300 and preferably greater than 60°. Typically the transducer is arranged to transmit at around 40 kHz. As is known in the art, such transducers are therefore suitable for reception at around the same frequency. The frequency choice is not critical although lower frequencies will tend to disperse more broadly which is favourable. However, with the hearing range of human ears sometimes extending close to 20 kHz, frequencies of around 25 kHz should be considered to be a minimum usable frequency.

Figure 3A:
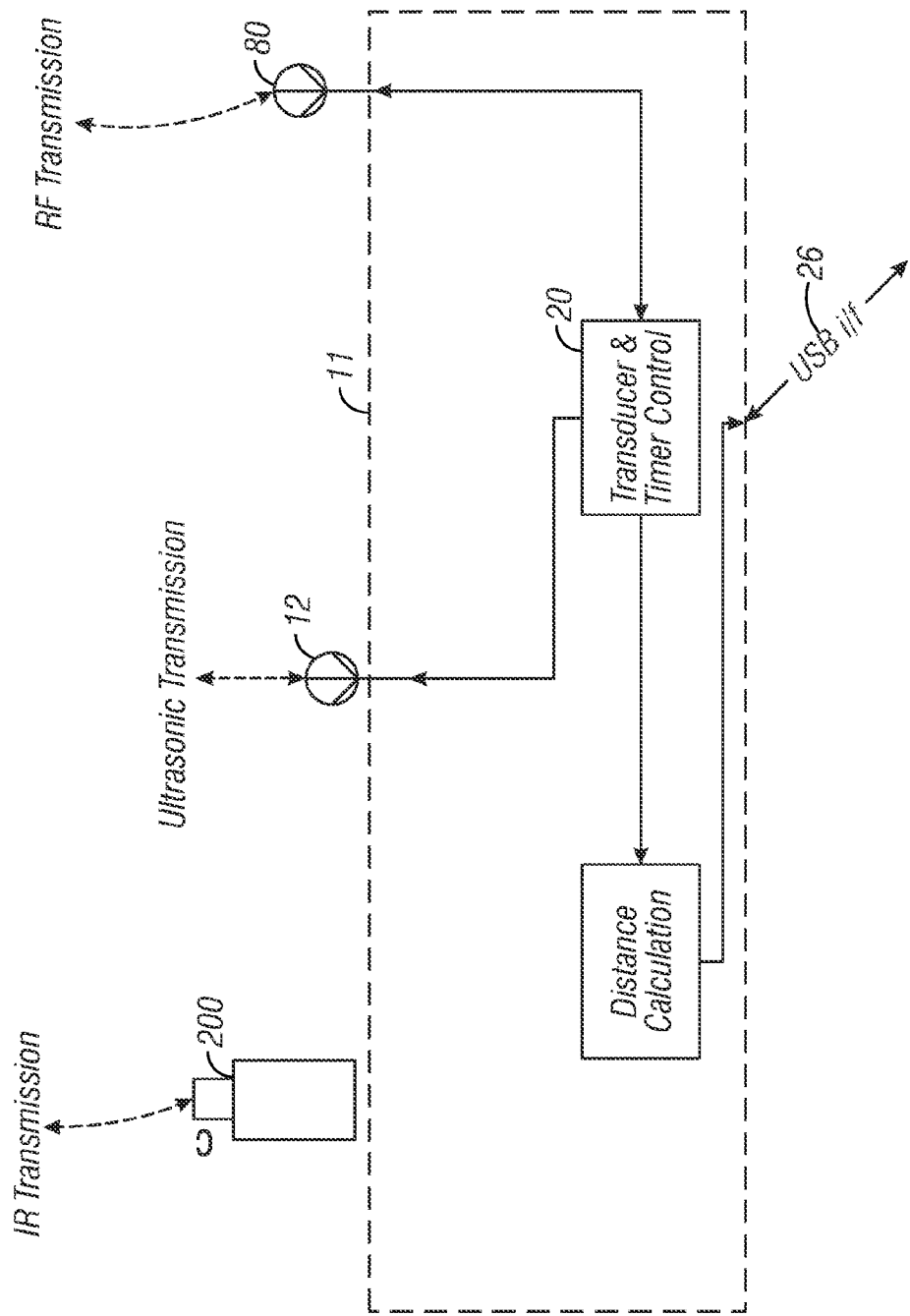
FIG. 3A is a schematic block diagram of a mobile component in accordance with the invention.

The transducer controller 6 serves to control the transmission, reception and idle modes of the transducers 10 and 82 and also to deal with the necessary amplification and buffering. The demodulator 8 is arranged to demodulate and recognise unique ID codes received by the transducer 82 as explained in more detail below. In FIG. 3A the transducer and timer controller 20 serves to control RF transducer 80 and ultrasonic transducer 12, while in FIG. 3B the transducer and timer controller 20 serves to control RF transducer 80, ultrasonic transducers 12, and timers 22.

The mobile component may also include one or more accelerometer and/or gyroscopic/compass sensors 84. This allows acceleration information and also twisting motions of the mobile component to be detected, measured and transmitted back to a fixed component 11 (described below) using wireless transmissions such as via the rf or ultrasonic transmissions 10 or 82.

With reference also to FIG. 3A, the fixed component 11 may have a plurality of ultrasonic transducers 12 which typically will generally be of the same construction as the transducer 10. Four transducers 12 are shown which provides 4 possible ultrasonically measured triangulation solutions which may then be averaged or otherwise processed, for improved accuracy. Only three transducers may be used (providing a single triangulation solution) if lesser accuracy is required. More than four transducers may also be used; providing further increased accuracy but at greater manufacturing cost.

Typically however, only one ultrasonic transducer is used (to provide a distance measurement) and the measurements in the other two dimensions are provided by the processing of the image received by the camera 200.

The fixed component 11 also includes an rf transducer 80 which is arranged to communicate with the transducer 82 as described in more detail in our co-pending application no. PCT/GB2007/003126.

When several mobile components are used together it is necessary to be able to match up the ultrasonic distance measurements with the correct IR point visible using the camera 200. The invention encompasses several ways of achieving this.

Firstly, the user may be asked to place the mobile components in a particular position at certain times, e.g. by striking a particular pose. This then allows the system to track movements of the IR points from their known positions and thereby maintain the identity of each point over time.

Secondly, the system may request that one or more of the IR LEDs transmits a known pulse sequence. The request may be made for example, by rf transmission. By seeing which LED pulses, it is possible to identify a particular point visible via the camera 200.

Thirdly, by using more than one ultrasonic transducer 12 on the fixed component, it is possible to obtain an ultrasonic position measurement, for example in only 2 dimensions, which may be correlated with the visual information received via the camera 200.

Figure 2B:
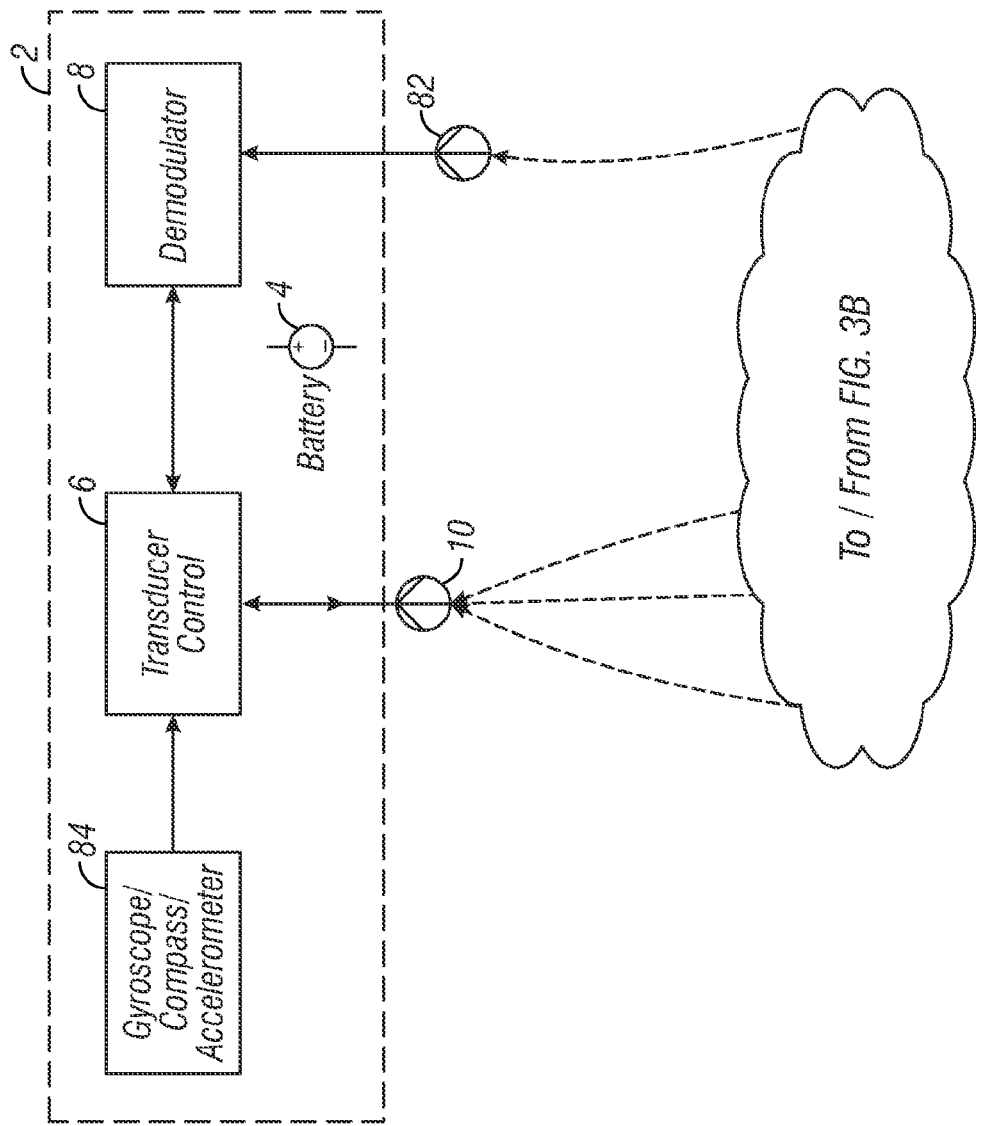
FIG. 2B is a schematic block diagram of a fixed component in accordance with the invention.
Figure 3B:
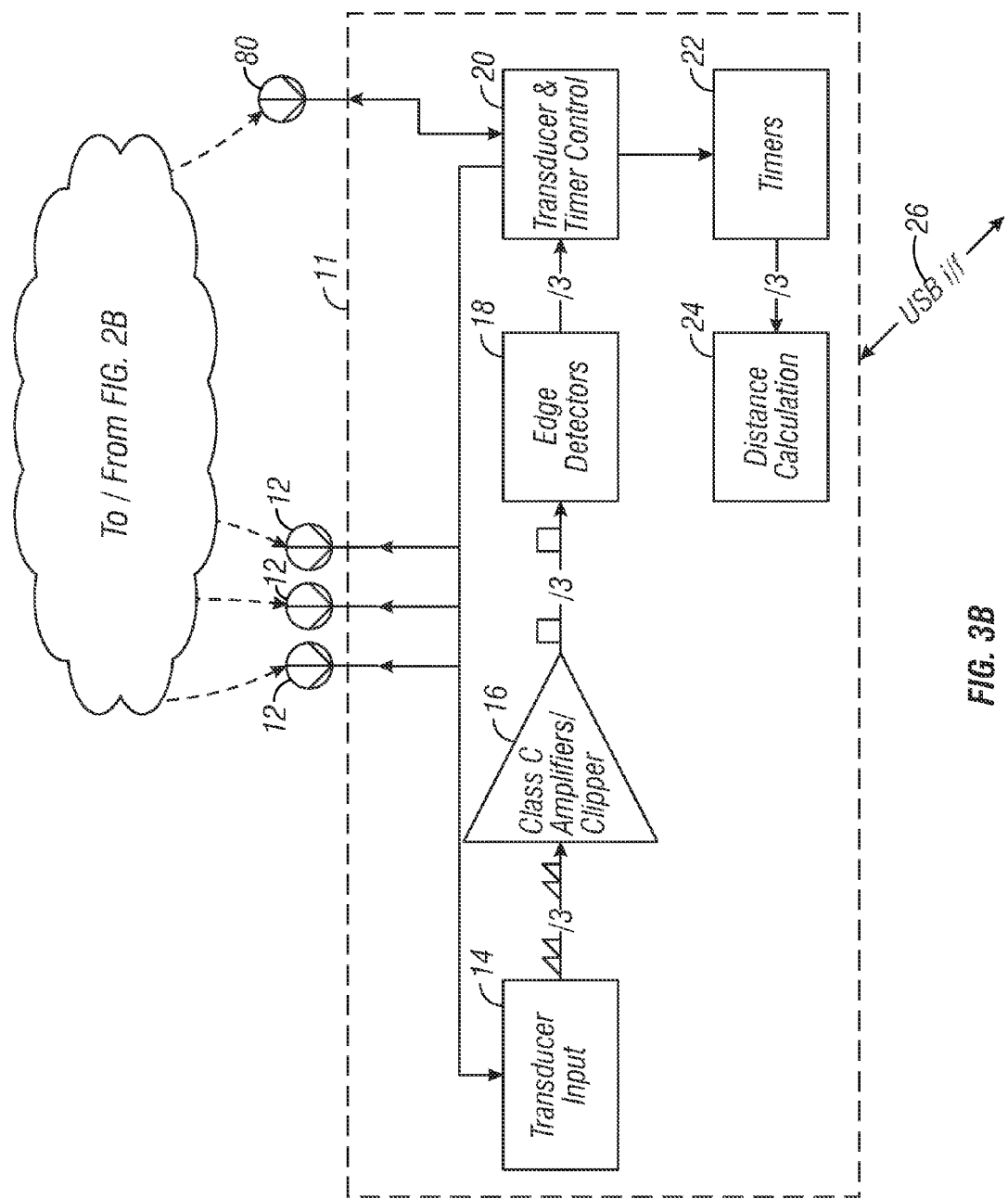
FIG. 3B is a schematic block diagram of a mobile component in accordance with the invention.

In this mode, the transmission and reception roles of the ultrasonic transducers 10,12 is temporarily reversed and operates as shown in FIGS. 2B and 3B and as described in our co-pending application PCT/GB2007/003126.

Fourthly a known relationship between IR LEDs on a solid object will generally allow the different LEDs to be identified by for example comparing known ratios of distances between points sensed by the camera 200.

In the case that the IR emitter 202 of a mobile component 2 has a significant size, a fifth way of matching the ultrasonic distance measurements to the mobile components presents itself. Specifically, the apparent size of the IR light source received by the camera 200 can be used to calculate an approximate distance for the mobile component, and this approximate distance can be compared to the distance determined by the ultrasonic components to make a match. Such a calculation would be based on the IR light source having a known width. Although there will be periods during which the mobile components will be at the same range from the camera, or at a range similar enough that the camera cannot distinguish between the sizes of the IR light sources, in normal use the mobile components will move around and occupy different ranges meaning this may be a useful tool for assigning an ultrasonic range reading to a visible location. In order to improve the camera's ability to detect the IR light source, a diffuser may be employed to present a larger target for the camera. In particular, a spherical diffuser may be advantageous in that it presents the same shape to the camera no matter what its orientation is. This shape of diffuser may also help in distinguishing the mobile component from the background sources of IR e.g. halogen light bulbs, and may facilitate the general recognition of the mobile component by the fixed component.

Matching the ultrasonic distance measurements to mobile components may be further improved by tracking the path of the mobile components. In particular, if two mobile components approach each other and become briefly indistinguishable to the camera, the paths of the mobile components leading up to the occlusion may be extrapolated and the ultrasonic range attached to each mobile component on the basis of which observed path best matches the originally extrapolated paths. This approach may be further improved by taking into account any acceleration or deceleration of the mobile components as they approach each other, e.g. if the mobile components are decelerating as they approach they may be less likely to cross paths and more likely to reverse direction.

As a further enhancement, the acceleration of the mobile component may be used to adjust error averaging of the position detection. Generally, in order to minimise the effect of errors, the sensed position of the mobile component is averaged over several readings. This averages out errors and provides a consistent position reading over time. However, the averaging also introduces delay between movement of the mobile component and recognition of this by the fixed component. This is because the first few readings after the movement has been started will be reduced in effect by the averaging calculation using historical position measurements taken before the movement commenced. This delay or lag may be noticeable by the user when the mobile component is being moved rapidly. By using the accelerometer data to determine the rapidity of movement, this problem may be overcome by reducing the number of samples used for averaging when the mobile component is accelerating above a predetermined threshold or set of thresholds (which may correspond to respective variations in the number of samples used for averaging) and then increasing the number of samples averaged again when the acceleration of the mobile component is lower. This works well because accuracy of position detection is subjectively less important when rapid movement is occurring and in contrast an increased delay in position reading is less important when movement is slow.

Thus using this process, accuracy may be increased by averaging out errors, when the user is able to notice error i.e. during slow movement and the accuracy may be reduced as a trade-off for increased responsiveness during rapid movement by reducing the averaging window length. Thus the window length may be reduced as certain accelerometer thresholds are met and increased in length again as the accelerometer data suggest reduced acceleration. Hysteresis may also be used for the accelerometer threshold detection.

Instead of using IR equipment to detect the two-dimensional location of the mobile component, equipment that uses other frequencies of light such as visible or ultra-violet light may be used. In particular, the camera 200 may be a generic visible light camera, as many such cameras are also sensitive to IR. Of course, such a camera would also be able to detect a visible light source, e.g. a white light LED. In such an embodiment, the brightness of the light source may be used discriminate between it and the background. Of course, using a visible light source has the disadvantage of being a possible source of distraction to the user. In a visible light system different mobile components could be distinguished between by their emitting of different colours of light, be it constantly (e.g. one red and one blue) or in a changing pattern/on request by the base unit. Of course, this may also be usable in an IR system, where the mobile components emit different frequencies of IR light, but multi-frequency IR LED's are less commonly available.

Ideally, the camera will be centred in use so that the range of movement of the mobile component is in the middle of, or based around, the centre of the field of view of the camera. In many user configurations, this will be achieved by tilting the camera away from the horizontal (e.g. in the case where the camera is mounted on top of a television that is at a lower level than the typical movement area of the mobile components, the camera will be tilted upwards in order to view the whole range of likely movement of the mobile component). In the case where the camera is tilted, the location data it produces is preferably corrected to take into account the altered readings, and ultimately correct for the tilt. This is desirable as e.g. in the example above (tilted upwards), a vertical up-down movement would appear to the camera as moving closer to the camera as the movement progresses. Another way of visualising this is to define a plane perpendicular to the axis of the camera at an arbitrary distance, against which the camera detects the 2D position of the mobile component. If the camera is tilted, this plane is at an angle to the vertical and hence a vertical movement would have a component that is perpendicular to the plane. Consequently, the 2D reading of the position of the mobile component would not change as rapidly as if the camera were not tilted.

If the tilt angle of the camera is known, then the tilt of the camera can be corrected for using simple trigonometry. The tilt angle of the camera may be determined using a number of methods.

Firstly, the user may estimate or measure the angle of tilt of the camera (e.g. against a graduated scale on the camera stand or fixed component) and enter the angle in via software, or by changing a value on the fixed component.

Secondly, the tilt angle of the camera may be calculated by having the user hold or move the mobile component in a known position or direction. The detected movement of the mobile component by the camera can be compared to this known "reference action" to determine the angle of tilt of the camera.

Thirdly, the camera or an associated component may contain one or more accelerometers. The accelerometer(s) can be used to measure the direction of the Earth's gravity and thus calculate the direction and amount of tilt in the camera. In the case of a camera mounting that can only tilt "up and down" (pitch), one accelerometer properly mounted may be sufficient to determine the angle of tilt. In a camera with greater freedom of movement, two accelerometers in a preferably perpendicular, and necessarily non-parallel, configuration may be used to fully detect the direction of gravity. As an alternative to accelerometers, magnetometers may be used to detect the direction of the Earth's, or any other local, magnetic field and adjust for the tilt of the camera. However, in such an embodiment local magnetic disturbances caused by e.g. Cathode Ray Tube televisions or large pieces of iron may cause unexpected results.

Fourthly, the fixed component may contain rotation sensors built into or otherwise coupled to the mounting or pivot points for the camera. These may be used to detect its relative tilt compared to the fixed unit.

In a further enhancement, the 2D position of the mobile component detected by the camera may be corrected for distortion caused by the camera itself e.g. the lens. Uncorrected, such distortion could cause unusual effects towards the edges of the camera's field of view, such as with a "fisheye" lens. The distortion caused by such a lens is known as "barrel" distortion. A different type of distortion that may be a problem is "vignetting". This is a drop off in light detection towards the edges of the field of view. If the measured intensity of the IR emitter is important, this will need to be corrected for. Of course, distortion may be caused by other features within the camera e.g. the shape or alignment of the light detector. As distortion is likely to be relatively constant between cameras having similar lenses and detectors, the distortion correction is unlikely to vary between two different fixed components and as such the appropriate correction can be determined and allowed for without any user involvement. It may be possible to determine the distortion for a camera using simple empirical methods.

Of great importance to the effectiveness of the tracking of this invention is the quality of the camera. In particular, the camera will preferably have a high resolution to ensure that the 2D location of the mobile component can be acquired with high precision. Furthermore, in order to maximise the available precision it is desirable that the area viewable by the camera (the cone of its line of sight) is not significantly larger than the area in which the mobile component is likely to be moved. This may be achieved, for example, by having a variable zoom on the camera. Alternatively, the camera may simply be configured to have an appropriate viewing area based on typical user distance and movement range. It is also desirable that the camera be capable of a high frame rate. In particular, many display units, such as television screens, operate at a refresh rate of 60 Hz so it is preferable that the camera is capable of at least an equivalent frame rate. Also, in order to be effectively picked up by the camera, it is desirable that the IR transmitter has a large angle over which IR is emitted, The angle of emission of the IR transmitter may be improved by using some form of diffuser.

A further enhancement to the invention is the implementation of a filtering algorithm in order to discount unreliable readings. In particular, due to the problems associated with ultrasonic range measurement, such as echo interference, the measured range may occasionally be erroneous. A single ultrasonic reading provides a radial distance between the mobile and fixed components at a particular time.

In a first filtering method, a reading can be compared to the previous reading to determine the radial speed at which the mobile component must have moved in order to be present at the new location. If this calculated speed is greater than a predetermined maximum, the new reading can be discounted as erroneous. The next reading can then be compared with the last valid reading, and the average speed over this period calculated and compared. In effect, such a filtering method defines an allowable range of readings that expands over time from the last valid reading, at the rate of the maximum allowable speed. As such, the likelihood of reacquiring a "valid" reading increases as time goes on, ensuring that the system does not go for too long between ultrasonic range readings. It may be preferable to set a further threshold time, after which any reading will be accepted, if the maximum allowable speed is not high enough to cover e.g. most of a room within 1 second of a last valid reading.

In a second filtering method, the tangential speed (speed in the two dimensions perpendicular to the range of the mobile component) of the mobile component is calculated based on the readings taken from the camera and the last valid ultrasonic range. This tangential speed may be combined with the calculated average radial speed between two ultrasonic readings to determine an overall speed of the mobile component. This overall speed can be compared with the maximum allowable speed (which may be different using this method to the method above) to determine whether or not to treat an ultrasonic reading as valid. As this method also considers the components of the mobile component's speed in all three dimensions, this method reduces the allowable range of readings in the radial direction.

In a third filtering method, the validity (or not) of an ultrasonic range or position can be determined using the average acceleration necessary, instead of speed, and comparing that to a maximum allowable acceleration. For example, the average speed calculated between a new point (the validity of which is to be determined) and the last valid point can be compared to the average speed between that valid point and the valid point preceding it to obtain a value for acceleration.

These filtering methods may be used in conjunction with, or separately from the accelerometer readings. In particular, by combining the above approach with the readings from the accelerometer can allow a figure for the maximum allowable velocity or acceleration to be calculated, rather than being an arbitrary constant. Furthermore, readings from any gyroscopic or magnetic sensors may also be useful in such a method.

The person skilled in the art will realise that the different embodiments and features listed here may readily be combined or used separately, depending on the application to which the invention is put. In particular, many of the embodiments and enhancements discussed above describe a system where the camera is mounted on the fixed component and a IR source on the mobile component. As mentioned elsewhere, this arrangement could be reversed. This modification is within the scope of the invention, and the enhancements described could be adapted for use in such a situation. For example, the IR source on the fixed unit could be based in a spherical diffuser, and the filtering methods described could be adapted for use in this reverse situation.

The person skilled in the art will further realise that where communication between the mobile component, or controller, and the fixed component is referred to, this may be carried out using ultrasonic signals, visual or infra-red light signals or RF signals, or any combination of the above. Different communication mechanisms will be appropriate for different tasks depending on e.g. the required reliability, or latency. Furthermore, although the communications are generally described as being directly between the fixed component and the mobile component, the person skilled in the art will appreciate that some of these communications may be carried out through intermediaries, be they other mobile components or the computer or games console to which the fixed unit is connected.

The embodiments and features listed here are intended to be descriptive, and there will be modifications that could be made to the embodiments within the scope of the claims.

What is claimed is:

1. A method for determining a position of a mobile controller relative to a fixed unit, wherein the mobile controller comprises an infrared (IR) light source and an ultrasonic transducer, and wherein the fixed unit comprises a camera and a first ultrasonic transducer, the method comprising the steps of:
   using the camera to determine an angular location of the IR light source relative to the fixed unit;
   determining a distance between the mobile controller and the fixed unit by measuring a time of flight of an ultrasonic transmission between the mobile controller and the fixed unit;
   determining a three dimensional position of the mobile controller, relative to the fixed unit, by combining the angular location with the distance;
   using the camera to track a path of the IR light source detected over time; and
   using the tracked path to distinguish the IR light source from a background light source, when the IR light source and the background light source are detected close to each other, by comparing the tracked path with a extrapolated path of the IR light source.

2. A method according to claim 1, further comprising:
   altering an illumination of the IR light source on receipt of a signal by the mobile controller from the fixed unit; and
   distinguishing the IR light source from other IR light sources by detecting the altered illumination of the IR light source using the camera.

3. A method according to claim 1, wherein the fixed unit further comprises a second ultrasonic transducer. the method further comprising:
   determining an approximate location for the mobile component by comparing the time of flight of ultrasound between the mobile controller and the first ultrasonic transducer and between the mobile controller the second ultrasonic transducer; and
   determining which IR light source belongs to the mobile controller by comparing the approximate location to an image detected by the camera.

4. A method according to claim 1, further comprising:
   averaging the time of flight of ultrasound between the mobile controller and fixed unit over two or more readings of the time of flight of ultrasound, for reducing an effect of errors on the determined distance.

5. A method according to claim 4, wherein the mobile controller further comprises an accelerometer, the method comprising:
   determining a speed of the mobile controller using the accelerometer; and
   reducing a number of readings used for averaging the time of flight of ultrasound when the controller is moving quickly.

6. A method according to claim 1, further comprising:
   correcting an image detected by the camera to remove distortion caused by the camera.

7. A method according to claim 1, wherein the fixed unit further comprises means for sensing the angle of tilt of the camera, the method comprising:
   detecting the angle of tilt of the camera from an upright position; and
   correcting information determined from an image captured by the camera while at the angle of tilt.

8. A method according to claim 1, further comprising filtering a measured distance reading by:
   comparing a measured distance reading to be tested to a last valid measured distance reading to determine an average speed: and
   rejecting the measured distance reacting to be tested if the average speed is above a maximum allowable speed.

9. A method according to claim 1. further comprising filtering measured distance reading by:
   calculating a tangential speed of the mobile controller by measuring a movement of the mobile controller with the camera and taking as a range of the mobile controller a last valid distance reading:
   comparing a measured distance reading to be tested to the last valid measured distance reading to determine an average radial speed;
   calculating an average speed by combining the tangential speed and the average radial speed; and
   rejecting the measured distance reading to be tested if the average speed is above a maximum allowable speed.

10. A method according to claim 1, further comprising filtering a measured distance reading by:
    comparing a measured distance reading to be tested to a last valid measured distance reading to determine a first average speed;
    comparing the last valid measured distance reading to a penultimate valid measured distance reading to determine a second average speed;
    comparing the first average speed to the second average speed to determine an average acceleration; and
    rejecting the measured distance reading to be tested if the average acceleration is above a maximum allowable acceleration.

11. A position sensing apparatus comprising:
    an ultrasonic transmitter;
    an ultrasonic receiver;
    an infrared transmitter;
    a two-dimensional (2D) infrared receiver;
    an image processing means for processing an image received by the 2D infrared receiver;
    a timer;
    a control means for coordinating functions of the 2D infrared receiver, the ultrasonic transmitter, and the timer; and
    a trigger means for activating the timer,
    wherein the apparatus comprises a mobile and a fixed component separate from one another,
    wherein ultrasonic and infrared components are located adjacent to one another in a heterogeneous pair on each of the mobile and the fixed components,
    wherein the apparatus is configured to transmit an ultrasonic pulse between the ultrasonic transmitter and ultrasonic receiver, and is configured to measure a time of flight of the ultrasonic pulse between the ultrasonic transmitter and receiver by:

starting the timer substantially simultaneously to transmission of the ultrasonic pulse, stopping the timer when the ultrasonic pulse has been received by the ultrasonic receiver, wherein in use the apparatus is further configured to determine a two-dimensional (2D) angular position of the infrared transmitter in relation to the 2D infrared receiver by processing the image received by the 2D infrared receiver, whereby an ultrasonic distance measurement from the time of flight of the ultrasonic pulse and an infrared angular measurement provide a three-dimensional (3D) position fix of the mobile component relative to the fixed component; and wherein in use the apparatus is further configured to use the 2D infrared receiver to track, over time, a course of an infrared light source transmitted by the infrared transmitter to distinguish the infrared light source from a background light source, when the infrared light source and the background light source are detected close to each other, by comparing the tracked course with a extrapolated course of the IR light source.

12. The position sensing apparatus according to claim 11, further comprising a second infrared transmitter in a known spatial relationship to the infrared transmitter, wherein the image processing means is configured to distinguish the infrared transmitter and the second infrared transmitter from a background by searching for the known relationship between the infrared transmitter and the second infrared transmitter.

13. The position sensing apparatus according to claim 11, wherein the infrared transmitter is of a known size, wherein the image processing means is configured to calculate an approximate range for the infrared transmitter by measuring a detected size of the infrared transmitter, and wherein the apparatus is configured to compare the approximate range with the ultrasonic distance measurement to validate a received infrared source received by the 2D infrared receiver as being the infrared transmitter.

* * * * *